Dec. 23, 1930. J. E. LE BUS 1,786,351
DRIVE OR CLUTCH MECHANISM FOR WINCHES
Filed Oct. 11, 1928    2 Sheets-Sheet 1
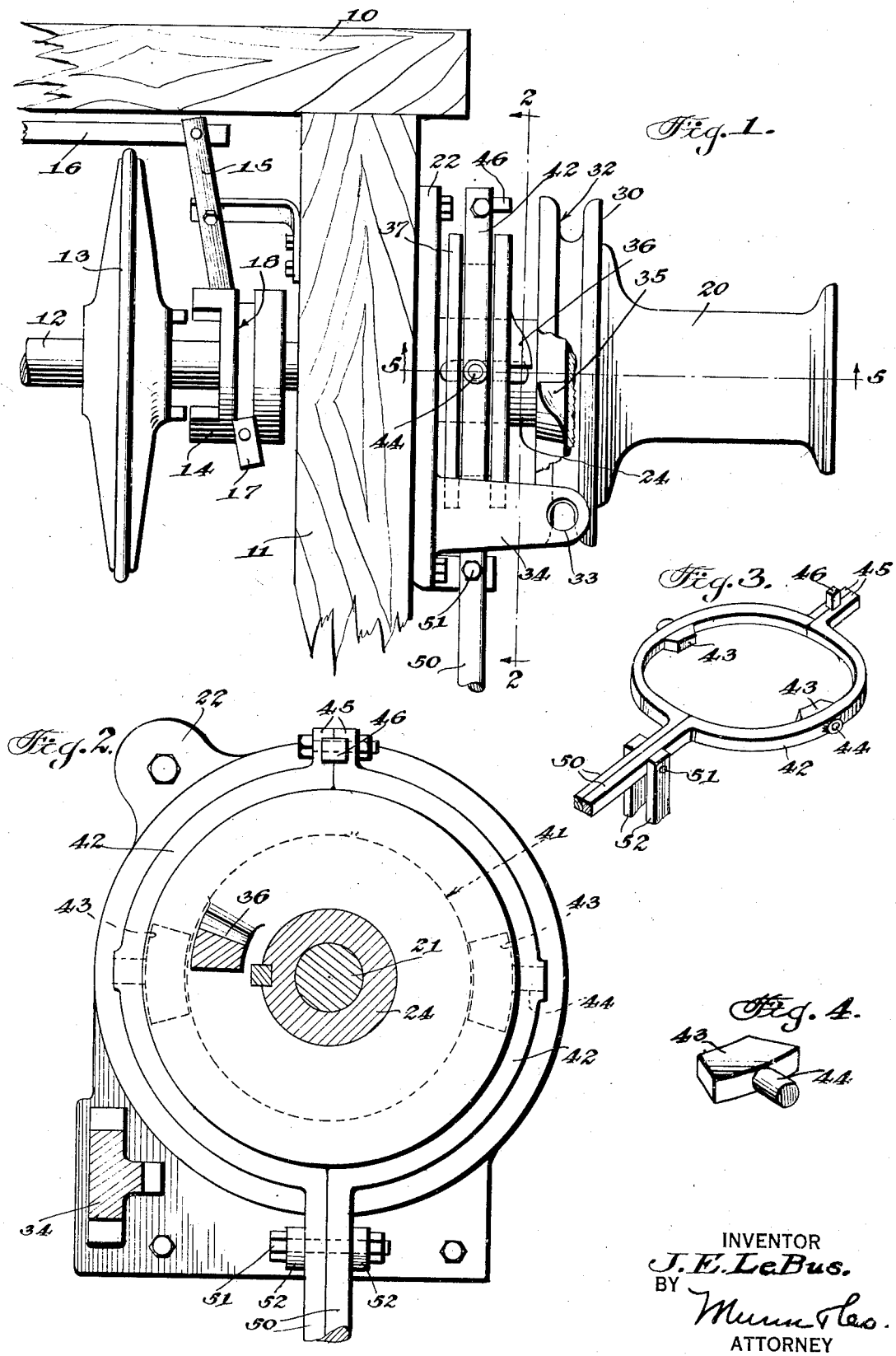

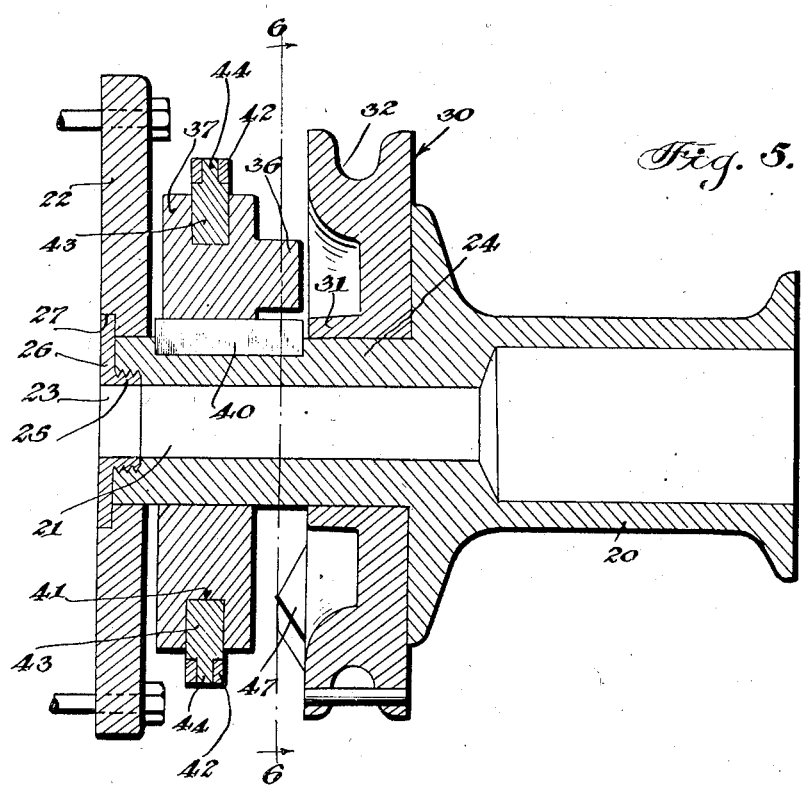
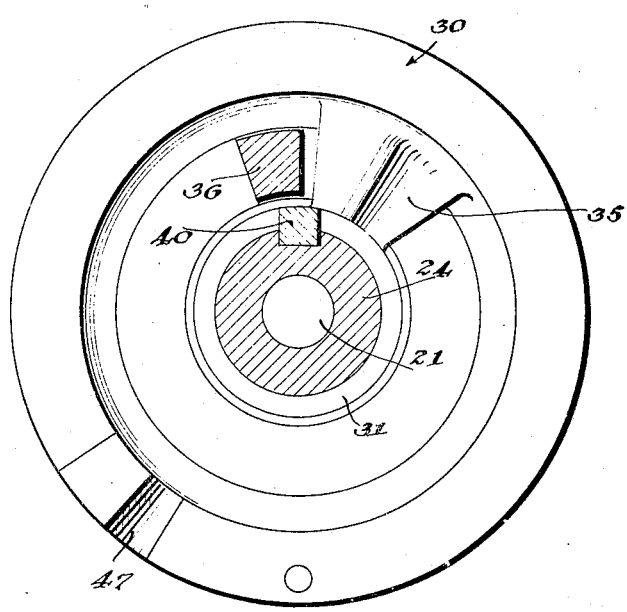

Patented Dec. 23, 1930

1,786,351

UNITED STATES PATENT OFFICE

JOHN E. LE BUS, OF ELECTRA, TEXAS

DRIVE OR CLUTCH MECHANISM FOR WINCHES

Application filed October 11, 1928. Serial No. 311,796.

This invention relates to a drive or clutch mechanism for a winch.

An object of the invention is the provision of a device for causing driving of a spool, the driving mechanism being adapted to be released from the spool at a predetermined time.

A further object of the invention is the provision of a winch adapted to be employed in place of the common cathead spool on a rotary drill rig and includes means for connecting the spool with a driving mechanism having a shiftable clutch carrying means for throwing out the clutch at a predetermined time.

This invention will be best understood from a consideration of the following detailed description in connection with the accompanying drawings; nevertheless, it is to be understood that the invention is not confined to the disclosure being susceptible of such changes and modifications as shall define no material departure from the salient features of the invention as expressed in the appended claims.

In the drawings:—

Figure 1 is a view in elevation of the clutch mechanism in a disengaged position, Figure 2 is a transverse vertical section taken along the line 2—2 of Fig. 1, Figure 3 is a view in perspective of a shifting yoke, Figure 4 is a view in perspective of one of the groove engaging members of the shifting yoke, Figure 5 is a horizontal section taken along the line 5—5 of Fig. 1, Figure 6 is a transverse vertical section taken along the line 6—6 of Fig. 5.

Referring more particularly to the drawings, 10 and 11 designate a pair of beams forming part of the supporting frame of the device which carries a shaft 12 having an element 13 of a clutch member adapted to be engaged by a co-operating clutch element 14 which is shifted into operative relation with the clutch element 13 by means of a lever 15, and a link 16. The lever is provided with a yoke 17 which engages a groove 18 in the clutch element 14.

A spool 20 is connected to one portion 21 of the shaft 12 in any approved manner and is revolved thereby. A plate 22 is connected to the beam 11 and a gland 23 retains the sleeve portion 24 of the spool 20 in proper relation with the plate 22. For this purpose the gland is threaded at 25 in a recessed portion of the sleeve 24, while a flange 26 on the gland is located within a pocket 27 of the plate 22.

A grooved wheel 30 has a hub portion 31 mounted for rotation on the sleeve 24. The wheel 30 has an annular groove 32 to receive a cable which passes through an opening 33 in a bar 34 which is connected to, or formed integrally with the plate 22. The wheel 30 is provided with a lug 35 adapted to be engaged by a lug 36 on a slidably mounted clutch member 37 for locking the clutch member 37 to the wheel 30.

The clutch member 37 is slidably keyed, as shown at 40, to the sleeve 24, so that said clutch member is revolved with the sleeve. The clutch member has an annular groove 41 in which is mounted a yoke 42 having lugs 43 projecting into the groove 41. Each lug has an integrally formed pin 44 received by a passage in the yoke 42, said lugs being located at diametrically opposite points. The yoke has a pair of projecting ears 45 on which is rigidly mounted a lug 46 adapted to be engaged by a cam member 47 on the inner face of the grooved wheel 30 for a purpose which will be presently explained. The yoke has a pair of arms 50 pivotally mounted at 51 on a pair of brackets 52 secured to the plate 22, so that if the arms 50 are oscillated the yoke will be rocked for moving the clutch element 37 into operative relation with the grooved wheel 30.

The operation of my device is as follows: The shaft 12 is adapted to be normally revolved for revolving the sleeve 24 and spool 20. Since the clutch element 37 is slidably keyed to the sleeve 24, the said element will likewise be revolved. When it is desired to cause rotation of the wheel 30, the arms 50 will be rocked forcing the clutch member 37 towards the wheel 30 so that the lug 36 of the clutch element 37 will engage the lug 35 of the wheel 30, thereby causing rotation of the wheel 30. Whenever the yoke 42 is moved to the right, in Fig. 1, a sufficient distance, the lug 46 will contact with the inner face of the wheel 30 and since the members or lugs 35 and 36 are in engagement, the wheel 30 will be revolved through approximately one revolution whereupon the cam 47 will engage the lug 46 and force the yoke rapidly away from the wheel 30, thus causing shifting of the clutch element 37 to the left in Fig. 5. This automatic shifting of the element 37 causes the lugs 35 and 36 to become disengaged and prevents further rotation of the wheel 30.

I claim:—

1. A winch comprising a driving shaft, a spool driven by the shaft, a wheel mounted for rotation on the spool, a pair of clutch elements for connecting the spool with the wheel, a shifter adapted to be rocked for placing one of the clutch elements into operative relation with the second clutch element, a lug on the shifter and a cam on the wheel adapted to engage the lug for causing automatic disengagement of the clutch elements, the spool being provided with an integrally formed sleeve, the first mentioned clutch element being slidably keyed on the sleeve.

2. A winch comprising a driving shaft, a spool driven by the shaft, a wheel mounted for rotation on the spool, a pair of clutch elements for connecting the spool with the wheel, a shifter adapted to be rocked for placing one of the clutch elements into operative relation with the second clutch element, cooperating means on the shifter and the wheel for causing automatic disengagement of the clutch elements, the spool being provided with an integrally formed sleeve, the first mentioned clutch element being slidably keyed on the sleeve.

JOHN E. LE BUS.